US010908334B2

(12) United States Patent
Schrama

(10) Patent No.: US 10,908,334 B2
(45) Date of Patent: Feb. 2, 2021

(54) MITIGATION OF PERCEIVED REDNESS OF INFRARED LIGHT

(71) Applicant: Lumileds LLC, San Jose, CA (US)

(72) Inventor: Charles André Schrama, San Jose, CA (US)

(73) Assignee: Lumileds LLC, San Jose, CA (US)

(*) Notice: Subject to any disclaimer, the term of this patent is extended or adjusted under 35 U.S.C. 154(b) by 0 days.

(21) Appl. No.: 16/852,153

(22) Filed: Apr. 17, 2020

(65) Prior Publication Data

US 2020/0333517 A1 Oct. 22, 2020

Related U.S. Application Data

(60) Provisional application No. 62/836,260, filed on Apr. 19, 2019.

(30) Foreign Application Priority Data

May 16, 2019 (EP) .................................... 19174935

(51) Int. Cl.

*G02B 5/20* (2006.01)
*F21S 41/13* (2018.01)

(Continued)

(52) U.S. Cl.

CPC .............. *G02B 5/208* (2013.01); *F21S 41/13* (2018.01); *F21S 41/285* (2018.01); *G02B 5/281* (2013.01); *F21Y 2115/10* (2016.08)

(58) Field of Classification Search

CPC .. F21S 41/10; F21S 41/13; F21S 41/14; F21S 41/151; F21S 41/18; G02B 5/208; G02B 5/281

See application file for complete search history.

(56) References Cited

U.S. PATENT DOCUMENTS

| | | | | |
|---|---|---|---|---|
| 2004/0174712 A1* | 9/2004 | Yagi | B60Q 1/14 | 362/475 |
| 2004/0240219 A1* | 12/2004 | Oishi | F21S 41/151 | 362/487 |

(Continued)

FOREIGN PATENT DOCUMENTS

| | | |
|---|---|---|
| CN | 201822843 U | 5/2011 |
| DE | 29806638 U1 | 6/1998 |

(Continued)

OTHER PUBLICATIONS

"European Application Serial No. 19174935.7, extended European Searc Report dated Nov. 27, 2019", 9 pgs.

(Continued)

*Primary Examiner* — Zheng Song
(74) *Attorney, Agent, or Firm* — Schwegman Lundberg & Woessner, P.A.

(57) ABSTRACT

An infrared illumination and detection system can include an infrared light source that can emit infrared light having a first wavelength. A visible light source positioned adjacent the infrared light source can emit visible light that overlaps the emitted infrared light. An infrared detector assembly, positioned adjacent the infrared light source and the visible light source, can include a wavelength-sensitive filter that can block wavelengths away from the first wavelength. The infrared detector assembly can include a sensor that can sense light at the first wavelength. The emitted infrared light can appear red when viewed by the human eye in the absence of the emitted visible light. The emitted visible light can optionally be sufficiently bright so as to substantially eliminate viewed redness when the infrared light and the visible light are viewed, together, by the human eye. Alternatives to reduce or eliminate the perceived redness are also provided.

20 Claims, 8 Drawing Sheets

400 432A 416 432B 434B 402C 402B 402A 434A 410B 402D 410A 430

(51) Int. Cl.

| | |
|---|---|
| ***F21S 41/20*** | (2018.01) |
| ***G02B 5/28*** | (2006.01) |
| *F21Y 115/10* | (2016.01) |

(56) References Cited

U.S. PATENT DOCUMENTS

| | | | | |
|---|---|---|---|---|
| 2005/0128727 | A1 | 6/2005 | Remillard et al. | |
| 2006/0181416 | A1* | 8/2006 | Chen | H05B 45/00 340/545.2 |
| 2008/0122597 | A1 | 5/2008 | Englander | |
| 2008/0137357 | A1* | 6/2008 | Friedrichs | F21S 41/13 362/507 |
| 2011/0193960 | A1 | 8/2011 | Endo et al. | |
| 2013/0327964 | A1* | 12/2013 | Otsuka | B60Q 1/0683 250/504 R |
| 2014/0055611 | A1 | 2/2014 | Wong et al. | |
| 2016/0082877 | A1* | 3/2016 | Oberhammer | B60Q 1/0023 348/46 |
| 2017/0048433 | A1 | 2/2017 | Lang et al. | |
| 2017/0265278 | A1* | 9/2017 | Endo | B60Q 1/30 |
| 2018/0343402 | A1 | 11/2018 | Roth et al. | |
| 2019/0059142 | A1* | 2/2019 | Chen | H05B 47/105 |
| 2019/0068857 | A1 | 2/2019 | Gruhlke | |
| 2020/0200356 | A1* | 6/2020 | Potter | B60Q 1/0011 |
| 2020/0207252 | A1* | 7/2020 | Guidi | B60R 11/04 |

FOREIGN PATENT DOCUMENTS

| | | | |
|---|---|---|---|
| DE | 102007026780 | A1 | 12/2008 |
| EP | 1759922 | A1 | 3/2007 |
| JP | 2005-112235 | A | 4/2005 |
| JP | 2005178576 | A | 7/2005 |
| JP | 2012-122824 | A | 6/2012 |
| WO | WO-2004/047421 | A2 | 6/2004 |

OTHER PUBLICATIONS

“International Application Serial No. PCT/US2020/028838, International Search Report dated Jul. 7, 2020”, 7 pgs.

“International Application Serial No. PCT/US2020/028838, Written Opinion dated Jul. 7, 2020”, 9 pgs.

* cited by examiner 402D
410B
402C
432B
434B
432A
416
402B
402A
410A
434A
430
400

548
544
552
540
546
536
538
550
530
542

MITIGATION OF PERCEIVED REDNESS OF INFRARED LIGHT

CROSS-REFERENCE TO RELATED APPLICATIONS

This application claims the benefit of U.S. Provisional Application No. 62/836,260, filed Apr. 19, 2019, and European Patent Application No. EP 19 17 4935.7, filed May 16, 2019, which are incorporated by reference in their entireties.

TECHNICAL FIELD

The present disclosure relates to an infrared illumination and detection system, suitable for use on a vehicle.

BACKGROUND

Modern vehicles include sensors to retrieve data regarding the vehicle's surroundings, and can use the data for accident avoidance, assisted-driving applications, autonomous driving applications, and other functions.

Figure 1:
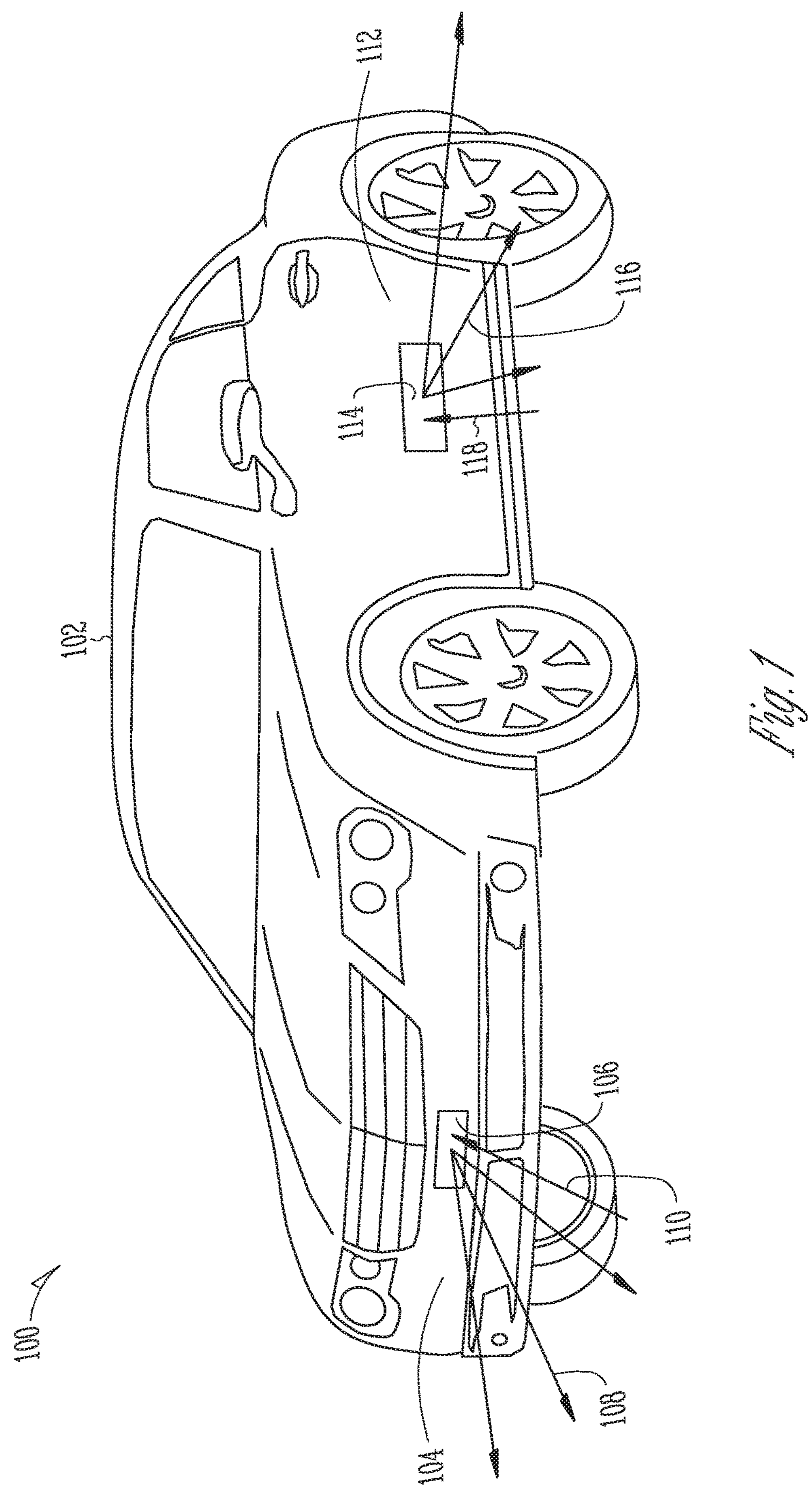
FIG. 1 shows an example of a vehicle that includes an infrared illumination and detection system, in accordance with some embodiments.

Corresponding reference characters indicate corresponding parts throughout the several views. Elements in the drawings are not necessarily drawn to scale. The configurations shown in the drawings are merely examples and should not be construed as limiting the scope of the disclosed subject matter in any manner.

DETAILED DESCRIPTION

There are government regulations (such as SAE J578, a standard defined and promulgated by SAE International) regarding the color of lights positioned on an exterior of a vehicle. In general, for typical passenger vehicles, the government regulations require that lights on the front of a vehicle only emit white light, lights on the left and right sides of a vehicle only emit amber light, and lights on the rear of a vehicle only emit red light. In other countries of the world that do not adhere to the SAE J578 standard, other visible colors of light may be acceptable in various locations on a vehicle.

Modern safety systems on a vehicle can produce images of the vehicle's surroundings, or retrieve data regarding the vehicle's surroundings, for use in accident prevention and object avoidance. In addition, autonomous driving or assisted-driving applications can also retrieve data regarding the vehicle's surroundings. Because the government regulations place requirements on light emitted from the vehicle for wavelengths up to 780 nm and are silent regarding infrared light emitted at wavelengths longer than 780 nm, using such infrared light to illuminate the vehicle's surroundings is beneficial for a variety of applications.

There are advantages to illuminating the vehicle's surroundings with infrared light. For example, illuminating the surroundings, rather than relying on reflections of ambient light, is beneficial because illumination can allow the safety system to operate at night. Using infrared light for illumination, rather than illuminating with visible light, is beneficial because infrared light is largely invisible to the human eye and does not create issues for other vehicle drivers. Further, using a specific, and relatively narrow, wavelength range for illumination and detection can be beneficial, because the illumination and detection can occur at a brightness level that can be significantly larger than what is present in ambient sunlight. For example, if illumination and detection occur in a relatively narrow infrared wavelength range centered about 940 nm (or another suitable infrared wavelength), it can be straightforward to illuminate with enough power to drown out any illumination effects caused by ambient sunlight or by other light-emitting elements in the surroundings. The required power for such narrowband illumination and detection can be small enough to avoid damaging eye tissue or other living tissue in the surroundings.

However, illuminating the surroundings with infrared light can cause an unexpected problem. As an artifact of human vision, the emissions from an infrared light source can spuriously be perceived by the human eye as being red. Specifically, while the infrared light reflected from the surroundings can be at an intensity low enough to be invisible to the human eye, a viewer looking directly into the infrared light source may view the relative high intensity of the light source as spuriously glowing red. As the emitting wavelengths increase (and, therefore, move farther away from the long-wavelength end of the visible spectrum, typically considered to be around 700 nm), the spurious effect decreases, but is still present.

As a result, simply placing an infrared source on the front or sides of a vehicle can be problematic, because to the human eye, such a source would be perceived as a red light, which is prohibited by the government regulations.

To overcome the problem of the infrared light source positioned on a front or sides of a vehicle exterior being perceived as a red light, which is prohibited by government regulations, a visible light source of a permitted color can be positioned in close proximity to the infrared light source, such that visible light emitted from visible light source overlaps with and masks the infrared light emitted from the infrared light source. The infrared and visible light sources, together, are perceived by the human eye as being a single light emitter having a color of the visible light source. A white light source can be used on a front of the vehicle. An amber light source can be used on sides of the vehicle.

FIG. 1 shows an example of an infrared illumination and detection system 100 disposed on a vehicle 102, in accordance with some embodiments. The vehicle 102, shown as an automobile in FIG. 1, can be any suitable motorized vehicle, including a truck, motorcycle, boat, or others.

The vehicle 102 can employ any or all of a self-driving feature, an accident avoidance feature, and/or a warning feature, which can be based on infrared imaging. To use any or all of these features, the vehicle 102 can illuminate all or a portion of its surroundings with infrared light and detect with an infrared-sensitive detector any infrared light that is reflected or scattered back to the vehicle.

On the front 104 of the vehicle 102, a front housing 106 can include an infrared light source to illuminate an area ahead of the vehicle 102 with infrared light 108, an infrared-sensitive detector to collect infrared light 110 reflected from objects ahead of the vehicle 102, and a white light source positioned in proximity to the infrared light source to mask the infrared light (the white light source and the IR source are not shown in FIG. 1 but are described in more detail, below). The white light emitted from the white light source overlaps the infrared light emitted from the infrared light source, such that the white light source and the infrared light source, together, appear to have the color of the white light source. The white light effectively masks the infrared light so that none of the light sources appear red, which would be the case if the white light source were absent or were displaced significantly from the infrared source. In some examples, the white light is sufficiently bright so as to substantially eliminate viewed redness when the emitted infrared light and the emitted white light are viewed, together, by the human eye. For example, the white light can have a power (in watts) that is greater than or equal to a power of the infrared light by a factor of 1.5, 2, 5, 10, or any suitable value.

Similarly, on a side 112 of the vehicle 102, a side housing 114 can include an infrared light source to illuminate an area alongside the vehicle 102 with infrared light 116, an infrared-sensitive detector to collect infrared light 118 reflected from objects alongside the vehicle 102, and an amber light source positioned in proximity to the infrared light source to mask the infrared light (the amber light source is not shown in FIG. 1 but is described in more detail, below). The amber light emitted from the amber light source overlaps the infrared light emitted from the infrared light source, such that the amber light source and the infrared light source, together, appear to have the color of the amber light source. In some examples, the amber light is sufficiently bright so as to substantially eliminate viewed redness when the emitted infrared light and the emitted white light are viewed, together, by the human eye. For example, the amber light can have a power (in watts) that is greater than or equal to a power of the infrared light by a factor of 1.5, 2, 5, 10, or any suitable value.

Figure 2:
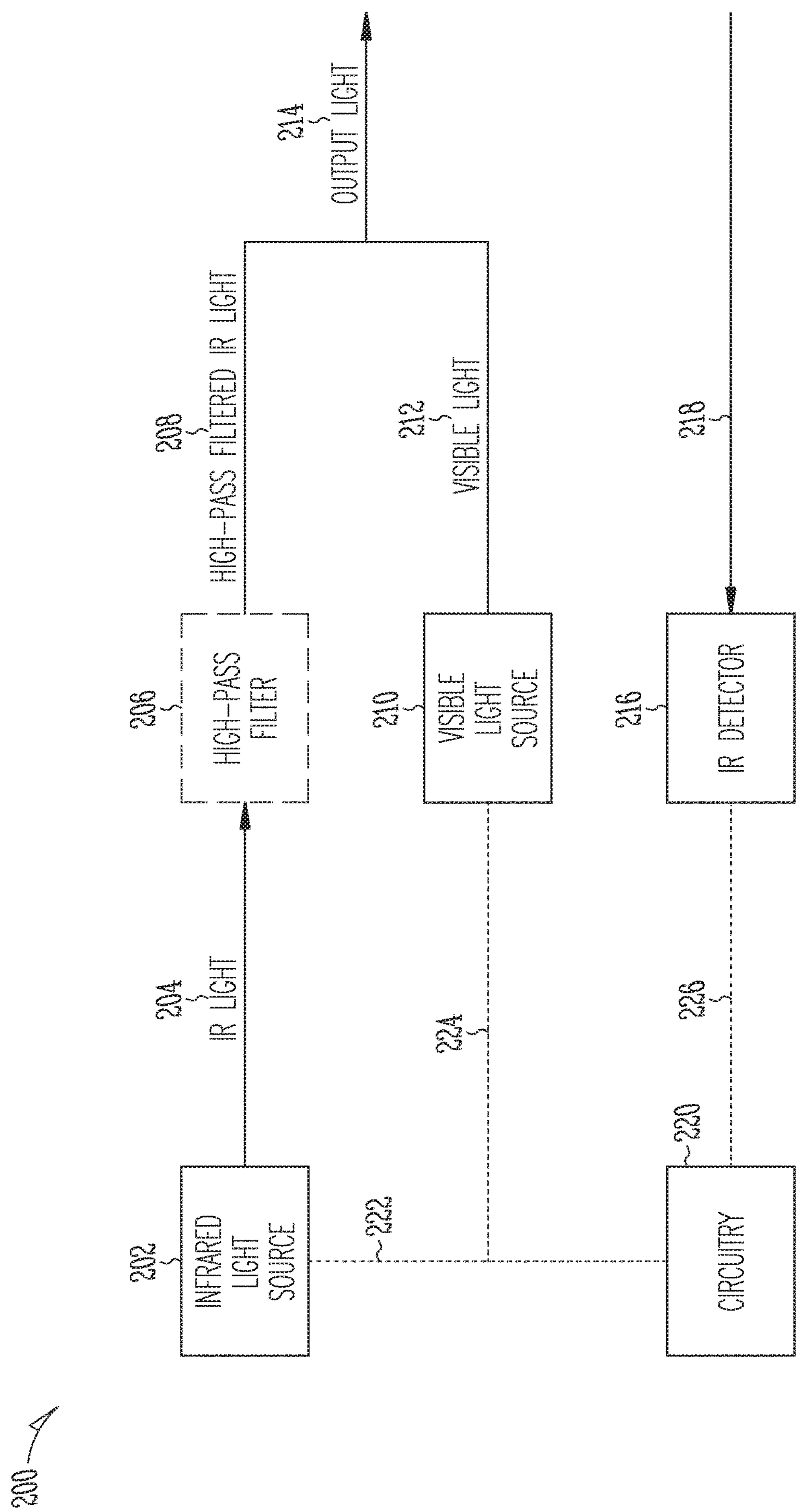
FIG. 2 shows an example of the infrared illumination and detection system of FIG. 1, in accordance with some embodiments.

FIG. 2 shows an example of the infrared illumination and detection system of FIG. 1, in accordance with some embodiments. In some examples, the visible light source can be a white light source, which is suitable for use on a front of a vehicle. In other examples, the visible light source can be an amber light source, which is suitable for use on a side of the vehicle. For other applications, other suitable colors can also be used, such as yellow, green, blue, and others.

The system 200 can include an infrared light source 202. In some examples, the infrared light source 202 can be a light-emitting diode, an array of light-emitting diodes, or multiple light-emitting diodes arranged in a specified pattern. In some examples, the infrared light source 202 can include a light emitting diode having an emission spectrum that peaks at a wavelength of 940 nm. In some examples, the infrared light source 202 can include a light emitting diode having an emission spectrum that peaks at a wavelength of 850 nm. Other wavelengths can also be used. Because government regulations are silent regarding wavelengths greater than 780 nm, the infrared light source 202 can have a spectrum that extends at least partially above 780 nm.

The infrared light source 202 can emit infrared light 204. In some examples, the infrared light source 202 can emit infrared light 204 into a cone, such that the cone of light is directed outward from the vehicle to illuminate the vehicle's surroundings. In some examples, the cone can be rotationally symmetric about a longitudinal axis, the longitudinal axis being orthogonal to an emission face of the light emitting diode. In some examples, the cone can be shaped to direct more light in a preferred direction, or less light away from the preferred direction. In some examples, optional shaping optics can distort or shape the cone as needed.

For examples in which the infrared light source 202 includes one or more light-emitting diodes, the spectrum of the emitted infrared light 204 is typically peaked at a peak wavelength, such as 850 nm, 940 nm, or others, and decreases at wavelengths away from the peak wavelength. In some examples, because government regulations may regulate light emissions having wavelengths less than 780 nm, it can be desirable to attenuate wavelengths of the emitted infrared light 204 that are less than 780 nm.

To accomplish this attenuation, an optional high-pass filter 206 can receive the emitted infrared light 204, can attenuate wavelengths less than 780 nm, such as by reflection or absorption, and pass, with relatively little or no attenuation, wavelengths greater than 780 nm, to produce high-pass filtered infrared light 208. In some examples, the high-pass filter 206 can have a cutoff wavelength that is at 780 nm, or near 780 nm. In some examples, the cutoff wavelength can be moved closer to the peak wavelength of the infrared light source 202, such as between 780 nm and the peak wavelength, such that high-pass filter 206 blocks wavelengths less than 780 nm, and can optionally block additional wavelengths between 780 nm and the cutoff wavelength.

In some examples, the optional high-pass filter 206 can be formed as a stand-alone optical element placed in the optical path of the emitted infrared light 204. In some examples, the optional high-pass filter 206 can be formed as a cover that is attached to or made integral with a housing. In some of these examples, the stand-alone optical element can be formed as a generally planar element, placed at normal incidence or a relatively low angle of incidence with respect to the emitted infrared light 204. In others of these examples, the stand-alone optical element can be a generally planar element, placed at a relatively high angle of incidence, such as 45 degrees, with respect to the emitted infrared light 204. By arranging the optional high-pass filter 206 in this manner, the high-pass filter 206 can also function as a wavelength-sensitive beamsplitter, which can fold in visible light to propagate directly on top of the optical path of the high-pass filtered infrared light 208. In still other examples, the optional high-pass filter 206 can be formed as a thin-film coating on one or more existing optical elements in the optical path of the emitted infrared light 204, such as a coating on an interior surface of a housing.

The system 200 can include a visible light source 210. In some examples, the visible light source 210 can be a light-emitting diode, an array of light-emitting diodes, or multiple light-emitting diodes arranged in a specified pattern. In some examples, the visible light source 210 can produce white or amber light.

There are government regulations that specify the wavelength spectrum of the visible light source 210. The government regulations rely on a well-defined chromaticity diagram, which is an accepted standard for specifying color. In general, single-wavelength colors of the visible spectrum are distributed around a perimeter of the chromaticity diagram, with red being located at the bottom-right corner, violet being located at the left-bottom corner, and green being located at the top-left portion. Mixed-wavelength colors are located in the interior of the chromaticity diagram, with white light being located close to the center.

Figure 3:
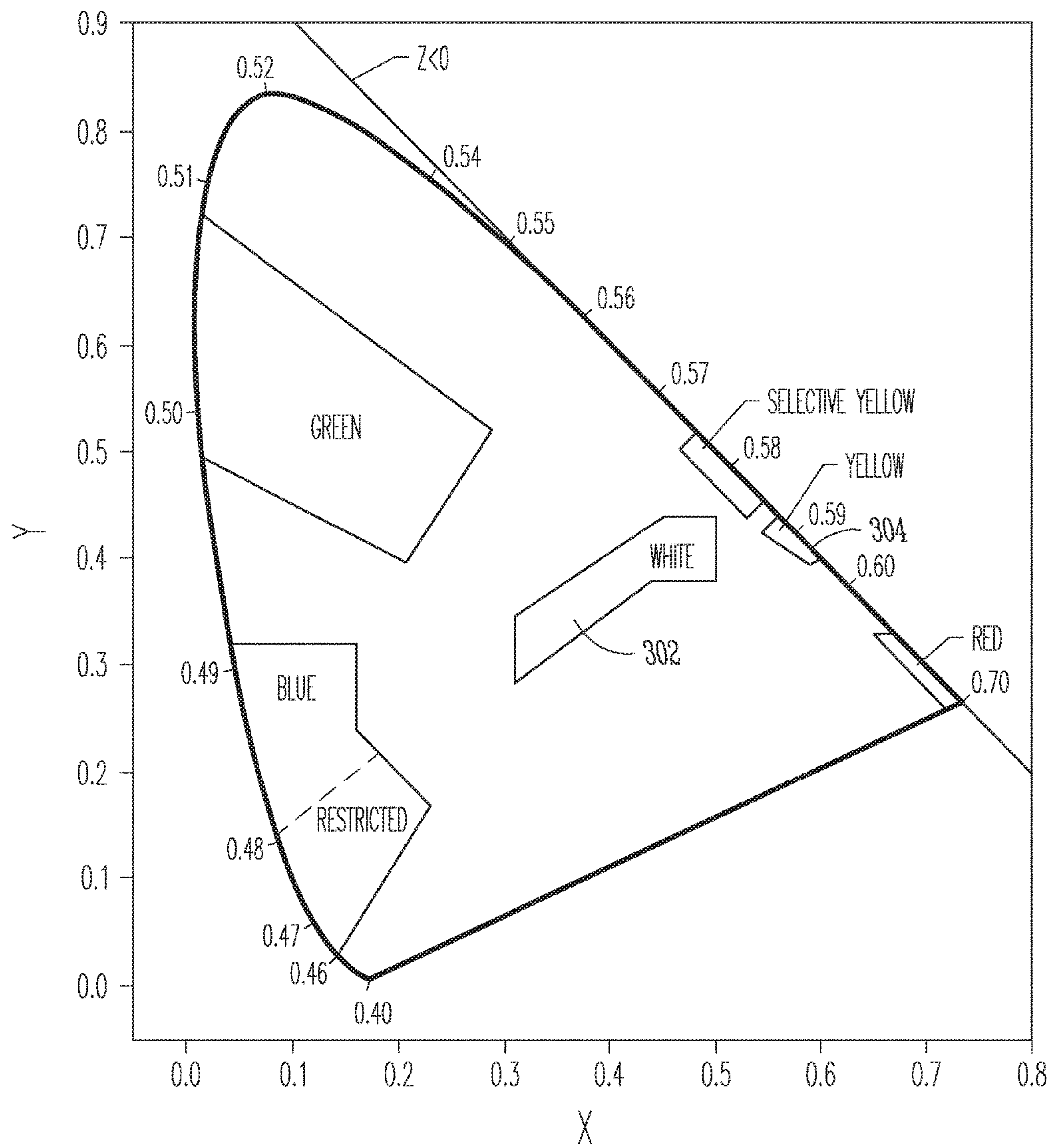
FIG. 3 shows an example of a chromaticity diagram for defining the wavelength spectrum of the visible light source, in accordance with some embodiments.

FIG. 3 shows an example of a chromaticity diagram for defining the wavelength spectrum of the visible light source, in accordance with some embodiments. The diagram of FIG. 3 is but one way of defining the wavelength spectrum of the visible light source; other suitable definitions can also be used.

A convenient way to specify a portion of the chromaticity diagram is through a collection of equations in the (x-y) plane, where each equation has a locus of solutions that define a line on the diagram, and the lines intersect to specify a particular area.

For visible light sources that emit white light, and are therefore suitable for use on the front of a vehicle, the suitable spectra are defined by a chromaticity that falls within the following boundaries of a chromaticity diagram:

$x=0.31$;

$x=0.50$;

$y=0.15+0.64x$;

$y=0.05+0.75x$;

$y=0.44$; and $y=0.38$.

The area within these boundaries is denoted by element 302.

As an alternative definition, the white light source can emit light that corresponds to light from a blackbody source operating at a color temperature between CIE Illuminant A (2854 K) and CIE Illuminant B (5000 K).

For visible light sources that emit amber light, and are therefore suitable for use on the sides of a vehicle, the suitable spectra are defined by a chromaticity that falls within the following boundaries of a chromaticity diagram:

$y=0.39$;

$y=0.79-0.67x$; and $y=x-0.12$.

The area within these boundaries is denoted by element 304.

The above sets of equations specify the color of the visible light 212 produced by the visible light source 210. Note that light outside the visible spectrum, which includes the infrared light produced by the infrared light source, does not affect a position on the chromaticity diagram. In addition, because the infrared light is coincident with the visible light, the above sets of equations should also specify the color of the combined visible and infrared light, as output light 214 (FIG. 2).

Returning to FIG. 2, in some examples, the visible light source 210 can emit visible light 212 into a cone, such that the cone of the visible light 212 overlaps the cone of the emitted infrared light 204, or, if the high-pass filter 206 is present, the cone of the high-pass filtered infrared light 208.

To accomplish this overlap, the visible light source 210 can be positioned proximate the infrared light source 202, with both light sources emitting light in generally the same direction. The separation between the visible light source 210 and the infrared light source 202 can be within 1 mm, 2 mm, 5 mm, 10 mm, 20 mm, or another suitable value. In general, the spacing should be sufficient that an observer who looks directly at the light sources sees only the visible light source 210; the red glow produced by the infrared light source 202 should be significantly overshadowed by the brightness of the visible light source 210.

As an alternative, the visible light source 210 and/or the infrared light source 202 can include multiple light-producing elements. In a specific example, the visible light source 210 can include two light-producing elements that are separated horizontally from one another, and the infrared light source 202 can include two light-producing elements for each light-producing element of the visible light source 210, positioned above and below the respective light-producing element of the visible light source 210.

As an alternative, or in addition to, placing the light sources close to one another, an optional beamsplitter can combine the visible and infrared light so that they are completely, or substantially completely, coincident. For example, the beamsplitter can redirect the output light beams such that the separation between the visible light source 210 and the infrared light source 202 can effectively be reduced to zero.

The beamsplitter can include a stand-alone element with a wavelength-sensitive coating. In some examples, the function of this beamsplitter can be combined with the that of the high-pass filter discussed above, with the beamsplitter including separate coatings that perform the high-pass filtering and the beam-combining, or the beamsplitter including a single coating that performs both tasks. As a specific example, the beamsplitter can be a 45-degree incident splitter, with a transmission path for the infrared light and a reflected path for the visible light, or a transmission path for the visible light and a reflected path for the infrared light.

As an alternative, an optional light guide can guide light from one light source to a region proximate the other light source, so that the visible and infrared light appear to emerge from the same locations.

The system 200 can include a detector 216 that is sensitive at the wavelength of the infrared light source 202. The detector 216 can sense light 218 that is reflected from objects surrounding the vehicle. In some examples, the detector 216 can be a multi-pixel sensor that can produce data representing a video image (or sequential static images) of the vehicle's surroundings. For these examples, the system 200 can additionally include imaging optics (not shown) that form an image of the vehicle's surroundings on the detector 216. In other examples, the detector 216 can be a single-pixel detector that merely detects an amount of infrared light that strikes the detector 216. In some examples, the system can optionally include a wavelength-sensitive filter than can filter out visible light from reaching the detector 216. In some examples, this filter can be combined with the high-pass filter 206, so that the high-pass filter 206 filters both infrared light 204 emitted from the infrared light source 202 and reflected light 218 returning from the objects surrounding the vehicle.

The system 200 can include circuitry 220 coupled to the infrared light source 220 via communication path 222, coupled to the visible light source 210 via communication path 224, and coupled to the detector 216 (e.g., an infrared detector) via communication path 226. The circuitry 220 can provide power to the light sources and can interpret a signal on communication path 226 to display images as needed on one or more displays in the vehicle.

The system 200 can optionally include baffling that can optically isolate the detector from the light sources. The baffling can include one or more absorbers or scatterers, in suitable shapes that can surround all or a portion of the detector and/or the sources.

Figure 4:
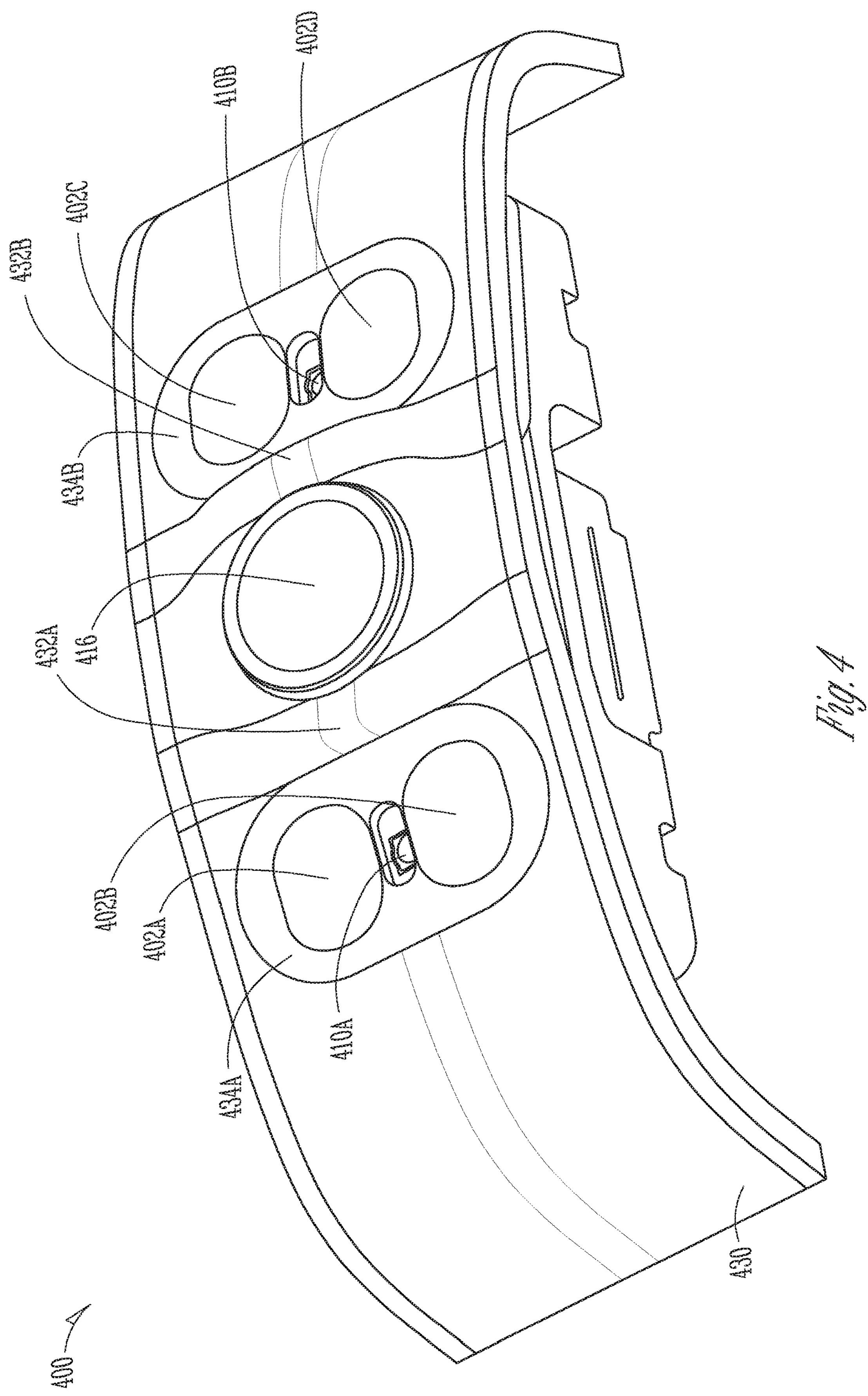
FIG. 4 shows an example of a housing suitable for use in an infrared illumination and detection system, in accordance with some embodiments.

FIG. 4 shows an example of a housing 430 suitable for use in an infrared illumination and detection system 400, in accordance with some embodiments. The housing 430 of FIG. 4 is but one specific example of a suitable housing; other configurations can also be used.

A detector assembly 416 can be positioned at a center of the housing 430. The detector assembly 416 can include an imaging lens and a multi-pixel sensor positioned at or near a focal plane of the imaging lens. In some examples, the focal length of the imaging lens and the element spacing can be selected to form an image on the sensor of objects that are up to three meters away from the housing. Other focal lengths can also be used, for imaging objects at other distances. In some examples, the imaging lens can be formed from polycarbonate. In other examples, the imaging lens can be formed from glass, or from another suitable optical material.

A first pair of infrared light sources 402A, 402B can be positioned to the left of the detector assembly 416, and a second pair of infrared light sources 402C, 402D can be positioned to the right of the detector assembly 416. In some examples, one light source 402A in the first pair can be positioned directly above the other light source 402B in the first pair. In some examples, one light source 402C in the second pair can be positioned directly above the other light source 402C in the second pair. In some examples, all four infrared light sources 402A through 402D have the same emission spectrum. In other examples, one infrared light source can have a different emission spectrum than another infrared light source. In some examples, the sensor can be responsive at wavelengths in the emission spectrum of the infrared light sources 402A through 402D. In some examples, the sensor can be responsive at a peak wavelength of the emission spectrum of the infrared light sources 402A through 402D.

A first visible light source 410A can be positioned to the left of the detector assembly 416, between the first pair of infrared light sources 402A, 402B. During operation, the visible light emitted from the first visible light source 410A can overwhelm or drown out any perceived redness from the first pair of infrared light sources 402A, 402B.

A second visible light source 410B can be positioned to the right of the detector assembly 416, between the second pair of infrared light sources 402C, 402D. During operation, the visible light emitted from the second visible light source 410B can overwhelm or drown out any perceived redness from the second pair of infrared light sources 402C, 402D.

A first lens 434A can be placed over the first pair of infrared light sources 402A, 402B and the first visible light source 410A. The first lens 434A can modify the angular emission pattern from the light sources. In some examples, the first lens 434A can be a negative lens, which can widen the angular emission pattern from the light sources. In some examples, the first lens 434A can be anamorphic, such that the first lens 434A can impart a first widening factor to the emission pattern along the horizontal direction, and impart a second widening factor, different from the first widening factor, to the emission pattern along the vertical direction. In some examples, all or a portion of the first lens 434A can optionally be frosted, such that emitted light can scatter angularly upon exiting the first lens 434A.

A second lens 434B can be placed over the second pair of infrared light sources 402C, 402D and the first visible light source 410B. The second lens 434B can function in the same manner as the first lens 434A.

A first light baffle 432A can extend outward from the housing 430 to selectively block light that is emitted from the first pair of infrared light sources 402A, 402B and the first visible light source 410A from reaching the sensor in the detector assembly 416. In some examples, the first light baffle 432A can be formed monolithically with the housing 430 and shaped as a protrusion in the housing material.

A second light baffle 432B can extend outward from the housing 430 to selectively block light that is emitted from the second pair of infrared light sources 402C, 402D and the second visible light source 410B from reaching the sensor in the detector assembly 416. In some examples, the second light baffle 432B can be formed monolithically with the housing 430 and shaped as a protrusion in the housing material.

In some examples, the first and second light baffles 432A, 432B can be formed as optical scatterers, which can impart an angular randomness to light exiting the scattering surface. The scattering elements can have a specified surface roughness suitable for scattering any incident visible or infrared light. In some examples, the first and second light baffles 432A, 432B can be formed as Lambertian scatterers, which can scatter incident light with an angular profile described by Lambert's cosine law. In other examples, the first and second light baffles 432A, 432B can be formed from absorbing material, which can absorb, rather than scatter, incident light.

Figure 5:
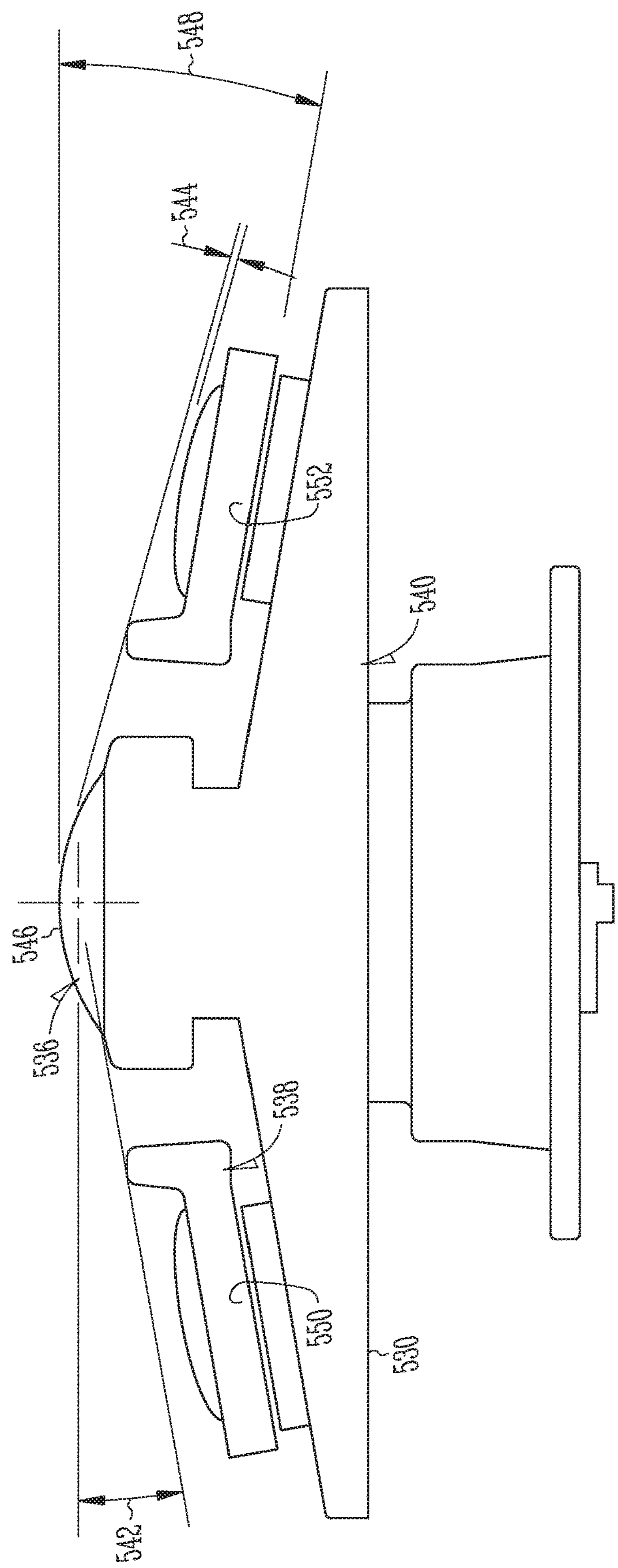
FIG. 5 shows a side view of a housing suitable for use in an infrared illumination and detection system in accordance with some embodiments.

FIG. 5 shows a side view of a housing 530 suitable for use in an infrared illumination and detection system, in accordance with some embodiments. The housing 530 is but one specific example of a suitable housing; other configurations can also be used.

The housing 530 can function as a heat sink and can mechanically support the illuminating and detection elements of the system.

An imaging lens 546, shown at the topmost portion of FIG. 5, can have an entrance pupil 536. In some examples, the entrance pupil 536 can coincide with an intersection between a longitudinal axis of the imaging lens 546 and an incident face (e.g., the surface facing an exterior of the housing 530) of the imaging lens 546. In other examples, the entrance pupil 536 can be above or below said intersection.

In the example of FIG. 5, light baffles 538 can be formed from a scattering or absorbing material and can optionally be formed separately from the housing 530.

The illuminating elements and light baffles 538 can be recessed, with respect to a plane of the entrance pupil 536, to leave an angular clearance 542 away from an intersection between the longitudinal axis of the imaging lens 546 and the entrance pupil 536 of the imaging lens 546. In some examples, the angular clearance 542 can be ten degrees, can be between eight degrees and twelve degrees, or can be any suitable angular clearance.

In some examples, the first set of illuminating elements can be inclined at a first inclination angle 548, with respect to the plane of the entrance pupil 536, such that as visible and infrared light propagates away from the housing 530, a center of the visible and infrared light ray bundle propagates away from the longitudinal axis of the imaging lens by an angle equal to the first inclination angle 548. In some examples, the first inclination angle 548 can be ten degrees, can be between eight degrees and twelve degrees, or can be any suitable angle. The second set of illuminating elements can be similarly inclined at a second inclination angle equal to the first inclination angle 548 but with an opposite sign of the first inclination angle 548. The first set of illuminating elements can be mounted on a first printed circuit board 550. The second set of illuminating elements can be mounted on a second printed circuit board 552. The center of each visible and infrared light ray bundle is orthogonal to the printed circuit board from which it propagates.

In some examples, a height of the cover can be further recessed by a clearance or recess value 544, with respect to the corresponding light baffle 538. In some examples, the recess value 544 can be equal to 1 mm, although other suitable values can also be used.

In a specific example, the four infrared light sources, together, can illuminate a field of view of 170 degrees in the horizontal direction and 120 degrees in the vertical direction, with an intensity uniformity of 72% within the angular field of view. This is but one numerical example; other suitable values and performance metrics can also be used.

The imaging lens 546 can be clear (e.g., with a smooth, non-scattering surface). The housing 530 can provide a cavity (not shown) extending between the imaging lens 546 and the sensor (not shown). The cavity can have a surface that is frosted, so that light passing through the imaging lens 546 and striking the frosted surface will scatter, rather than reflect specularly. Such scattering can reduce the probability that a light ray striking the surface will be redirected onto the sensor.

A detector assembly, or camera, can include the imaging lens 546, a multi-pixel sensor, and an optionally-frosted cavity extending between the imaging lens and the sensor. In a specific example, the imaging lens focal length and the element spacing can be selected such that the imaging lens forms an image on the sensor of objects up to 3 meters away from the housing 530. The objects can be illuminated with light emitted from the infrared light sources.

An infrared optics module can include the infrared light sources, or infrared LEDs, an optionally obscured interior, and an optional wavelength filter that can block a visible portion of the spectrum and pass an infrared portion of the spectrum. In some examples, the wavelength filter can be a high-pass filter with a filter edge at a wavelength of 780 nm or greater than 780 nm.

Figure 6A:
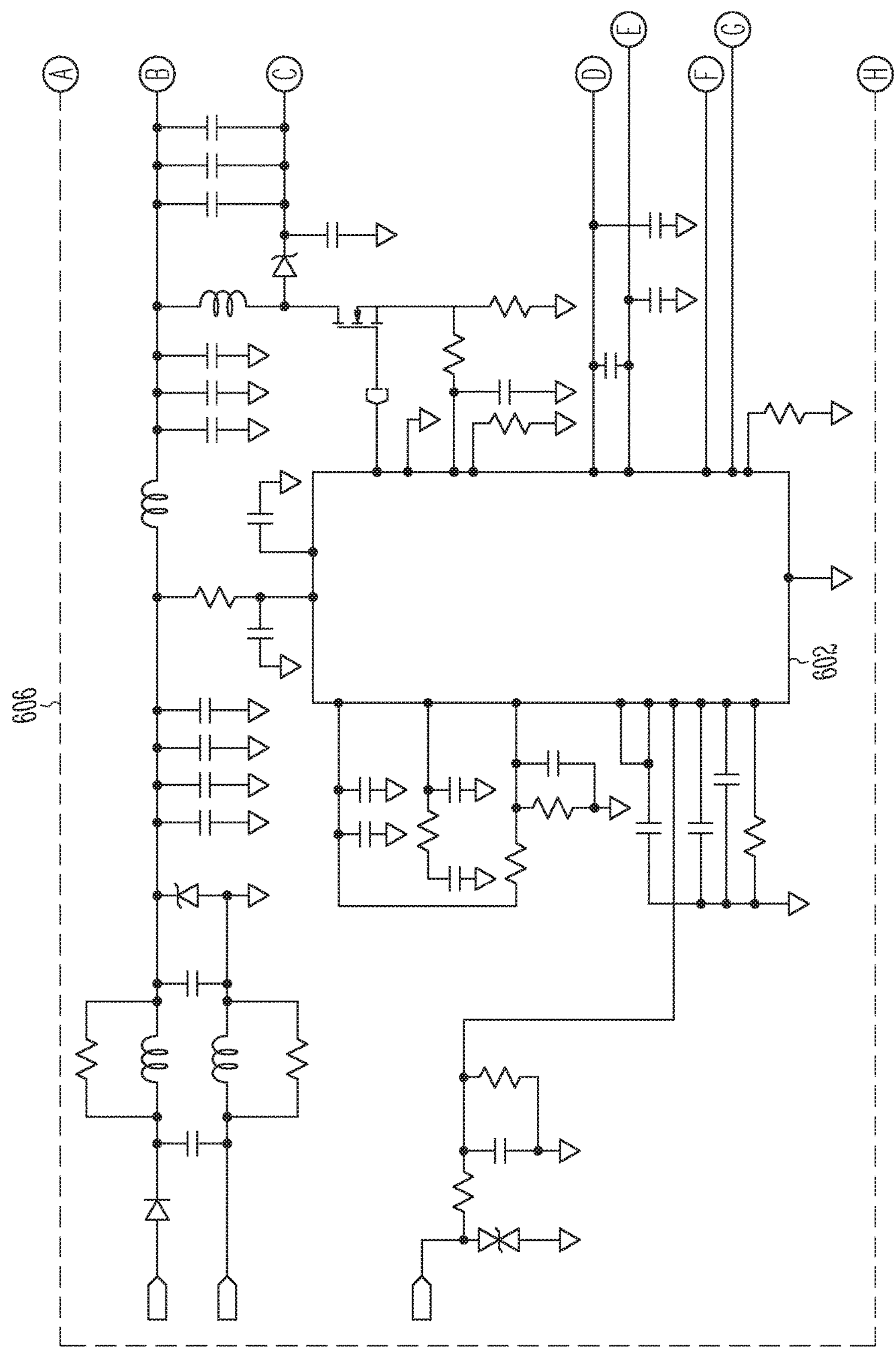
FIGS. 6A and 6B shows an example of a multi-LED driver circuit suitable for use in an infrared illumination and detection system, in accordance with some embodiments.
Figure 6B:
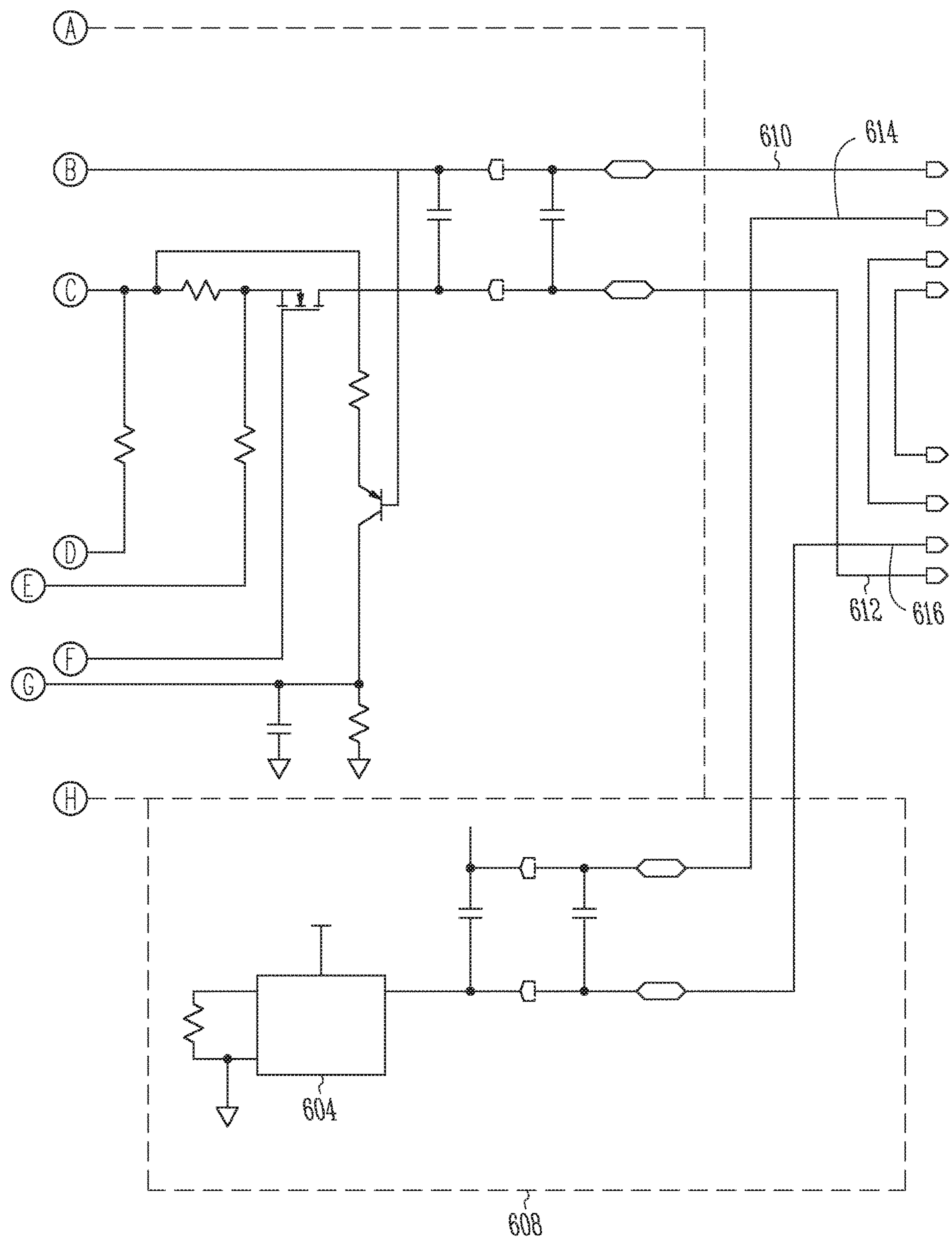

FIGS. 6A and 6B show an example of a multi-LED driver circuit 600 suitable for use in an infrared illumination and detection system, in accordance with some embodiments. The configuration of FIGS. 6A and 6B is but one configuration for such a multi-LED driver circuit; other configurations can also be used. The configuration of FIGS. 6A and 6B is suitable for use in the infrared illumination and detection systems discussed above, in addition to other systems that use multiple LEDs.

The multi-LED driver circuit 600 can include a first LED driver integrated circuit 602, which can electrically power one or more infrared LEDs, such as the infrared light sources discussed above. The circuit 600 can include additional circuitry 606 to provide inputs, outputs, and power to the first LED driver integrated circuit 602. The additional circuitry 606 can direct first outputs 610, 612 to the infrared light source or sources to power the infrared LED or LEDs.

The multi-LED driver circuit 600 can include a second LED driver integrated circuit 604, separate from the first LED driver integrated circuit 602. The second LED driver integrated circuit 604 can electrically power one or more visible LEDs, such as the visible light sources discussed above. The circuit 600 can include additional circuitry 608 to provide inputs, outputs, and power to the second LED driver integrated circuit 604. The additional circuitry 608 can direct second outputs 614, 616 to the visible light source or sources to power the visible LED or LEDs. In some examples, the second LED driver integrated circuit 604 can electrically power one or more amber-colored LEDs. In some examples, the second LED driver integrated circuit 604 can electrically power one or more white-light LEDs.

In some examples, the multi-LED driver circuit 600 can be formed on a circuit board, with the first LED driver integrated circuit 602 and the second LED driver integrated circuit 604 being formed as discrete integrated circuit chips that are positioned on the circuit board.

Figure 7:
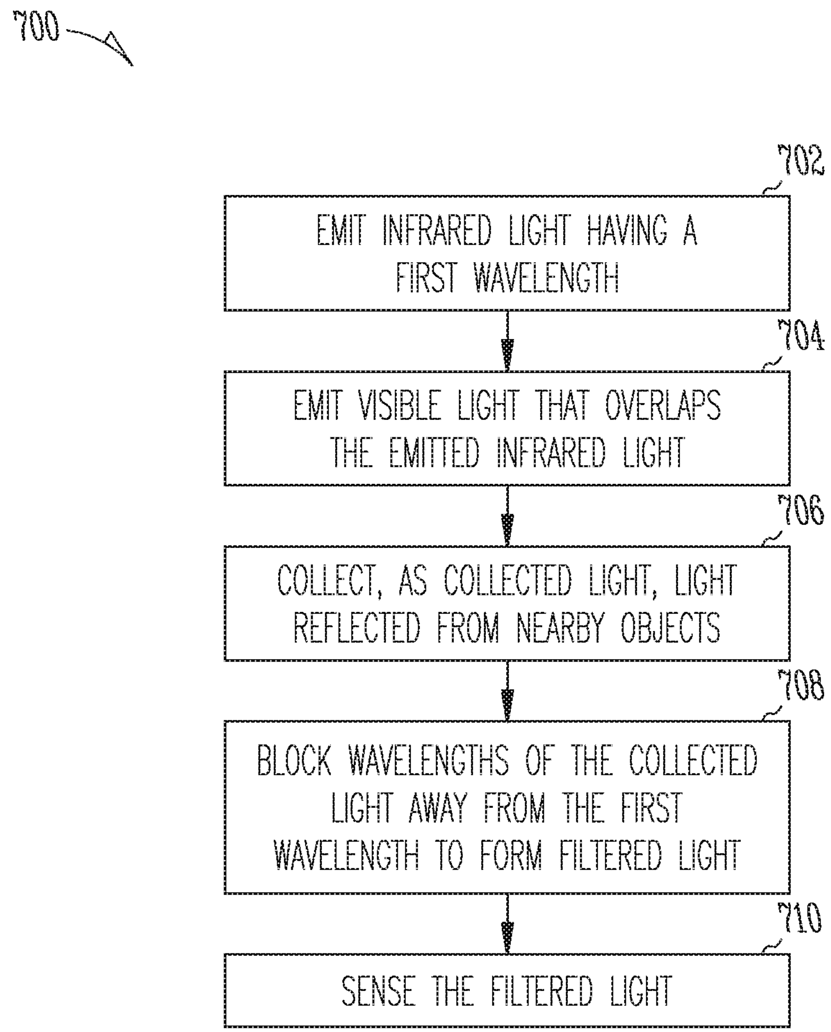
FIG. 7 shows an example of a method for performing infrared illumination and detection, in accordance with some embodiments.

FIG. 7 shows an example of a method 700 for performing infrared illumination and detection, in accordance with some embodiments. The method 700 can be performed by any of the systems discussed above, or on other suitable systems. The method 700 is but one example of a method for performing infrared illumination and detection; other suitable methods can also be used.

At operation 702, the system can emit, with an infrared light source, infrared light having a first wavelength.

At operation 704, the system can emit, with a visible light source positioned adjacent the infrared light source, visible light that overlaps the emitted infrared light.

At operation 706, the system can collect, as collected light, light from the infrared light source and the visible light source that is reflected from nearby objects.

At operation 708, the system can block, with a wavelength-sensitive filter, wavelengths of the collected light away from the first wavelength to form filtered light.

At operation 710, the system can sense, with a sensor positioned adjacent the infrared light source and the visible light source, the filtered light.

In some examples, an infrared illumination and detection system can include an infrared detector assembly configured to sense light at a first wavelength. The infrared detector assembly can define a longitudinal axis as extending from about a center of a sensor of the infrared detector assembly through about a center of a lens of the infrared detector assembly. The infrared detector assembly can define a first plane as being substantially orthogonal to the longitudinal axis and passing through an intersection of the longitudinal axis and a surface of the lens of the infrared detector assembly. The infrared detector assembly can be disposed entirely on a first side of the first plane. A housing, coupled to the infrared detector assembly, can be disposed entirely on the first side of the first plane. A first set of light-emitting diodes (LEDs) can be coupled to the housing. The first set of LEDs can be disposed entirely on the first side of the first plane. Each LED in the first set of LEDs can emit light from the first side of the first plane to a second side of the first plane. Each LED in the first set of LEDs can have an emission surface that is substantially parallel to a second plane that is angled with respect to the first plane. The first set of LEDs can include a first infrared LED that can emit light with a spectrum that substantially includes the first wavelength. The first set of LEDs can include a first visible LED that can emit light with a spectrum that substantially excludes the first wavelength.

In some examples, a first circuit board can mechanically support and electrically power the first set of LEDs.

In some examples, the first circuit board can be located in a plane that is substantially parallel to the second plane.

In some examples, the first circuit board can modulate the first infrared LED. For example, the first circuit board can cause the infrared LED to blink, to power on and power off periodically or irregularly, to cycle between a first power (which can include zero) and a second power, to power on for the duration of an exposure for an infrared image and power off thereafter, and/or to encode data on the infrared light. Other suitable modulations can also be used.

In some examples, a first light baffle can be disposed between the infrared detector assembly and the first set of LEDs, disposed entirely on the first side of the first plane and spaced apart from the first plane, and arranged to prevent light emitted by the first set of LEDs from directly entering the infrared detector assembly.

In some examples, the infrared detector assembly can include a wavelength-sensitive filter that can block light at wavelengths away from the first wavelength.

In some examples, the infrared detector assembly can include a high-pass filter with a filter edge wavelength greater than or equal to about 780 nm, such that light at wavelengths less than about the filter edge wavelength can be substantially blocked and light at wavelengths greater than the filter edge wavelength can be substantially directed onto the sensor.

In some examples, the sensor can be a multi-pixel sensor that is positioned at or near a focal plane of the lens.

In some examples, the sensor can be a multi-pixel sensor that is spaced apart from the lens to form an image on the multi-pixel sensor of objects up to about three meters away from the housing.

In some examples, the first set of LEDs can further include a second infrared LED that can emit light with a spectrum that includes the first wavelength. The first visible LED can be located between the first infrared LED and the second infrared LED. A first anamorphic lens can angularly widen the infrared light emitted from the infrared LED and the second infrared LED.

In some examples, a second set of LEDs can be coupled to the housing such that the infrared detector assembly is located between the first set of LEDs and the second set of LEDs. The second set of LEDs can be disposed entirely on the first side of the first plane. Each LED in the second set of LEDs can emit light from the first side of the first plane to the second side of the first plane. Each LED in the second set of LEDs can have an emission surface that is substantially parallel to a third plane that is angled with respect to the first plane and angled with respect to the second plane. The second set of LEDs can include a third infrared LED that can emit light with a spectrum that substantially includes the first wavelength. The second set of LEDs can include a second visible LED that can emit light with a spectrum that substantially excludes the first wavelength.

In some examples, a second circuit board can mechanically support and electrically power the second set of LEDs.

In some examples, the second circuit board can be located in a plane that is substantially parallel to the third plane.

In some examples, the first plane and the second plane can be angled apart by a first angle. The first plane and the third plane can be angled apart by a second angle. The second angle can substantially equal the first angle.

In some examples, the first plane and the second plane can be angled apart by a first angle. The first plane and the third plane can be angled apart by a second angle. The first angle and the second angle can be between about eight degrees and about twelve degrees, respectively.

In some examples, a method for illuminating and imaging a scene can include producing first infrared light with a first infrared light-emitting diode (LED) and a second infrared LED that are disposed on a first circuit board. The method can further include angularly widening the first infrared light with a first anamorphic lens to produce first widened infrared light. The method can further include producing first visible light with a first visible LED that is disposed on the first circuit board. The method can further include producing second infrared light with a third infrared LED and a fourth infrared LED that are disposed on a second circuit board, the second circuit board being angled with respect to the first circuit board. The method can further include angularly widening the second infrared light with a second anamorphic lens to produce second widened infrared light. The method can further include producing second visible light with a second visible LED that is disposed on the second circuit board. The method can further include directing the first widened infrared light, the second widened infrared light, the first visible light, and the second visible light toward a scene as illuminating light. The method can further include reflecting, from the scene, at least some of the illuminating light to form reflected light. The method can further include collecting, with a lens, at least some of the reflected light to form collected light. The method can further include spectrally filtering, with a wavelength-sensitive filter, the collected light to block wavelengths away from a first infrared wavelength to form spectrally filtered light. The method can further include detecting, with a multi-pixel sensor, the spectrally filtered light to form image data that corresponds to the scene, the multi-pixel sensor being angled with respect to both the first circuit board and the second circuit board.

In some examples, an infrared illumination and detection system can include an infrared detector assembly that can sense light at a first wavelength. The infrared detector assembly can define a longitudinal axis as extending from about a center of a multi-pixel sensor of the infrared detector assembly through about a center of a lens of the infrared detector assembly. The infrared detector assembly can define a first plane as being substantially orthogonal to the longitudinal axis and passing through an intersection of the longitudinal axis and a surface of the lens of the infrared detector assembly. The infrared detector assembly can be disposed entirely on a first side of the first plane. The infrared detector assembly can include a high-pass filter with a filter edge wavelength greater than or equal to 780 nm. Light at wavelengths less than the filter edge wavelength can be blocked and light at wavelengths greater than the filter edge wavelength can be directed onto the multi-pixel sensor. A housing, coupled to the infrared detector assembly, can be disposed entirely on the first side of the first plane. A first set of light-emitting diodes (LEDs) can be coupled to the housing. The first set of LEDs can be disposed entirely on the first side of the first plane. Each LED in the first set of LEDs can emit light from the first side of the first plane to a second side of the first plane. Each LED in the first set of LEDs can have an emission surface that is substantially parallel to a second plane that is angled with respect to the first plane. The first set of LEDs can include a first infrared LED and a second infrared LED that can emit light with a spectrum that substantially includes the first wavelength. The first set of LEDs can include a first visible LED that can emit light with a spectrum that substantially excludes the first wavelength. A first circuit board can mechanically support and electrically power the first set of LEDs. The first circuit board can be located in a plane that is substantially parallel to the second plane. A second set of LEDs can be coupled to the housing such that the infrared detector assembly is located between the first set of LEDs and the second set of LEDs. The second set of LEDs can be disposed entirely on the first side of the first plane. Each LED in the second set of LEDs can emit light from the first side of the first plane to a second side of the first plane. Each LED in the second set of LEDs can have an emission surface that is substantially parallel to a third plane that is angled with respect to the first plane and angled with respect to the second plane. The second set of LEDs can include a third infrared LED and a fourth infrared LED that can emit light with a spectrum that substantially includes the first wavelength. The second set of LEDs can include a second visible LED that can emit light with a spectrum that substantially excludes the first wavelength. A second circuit board can mechanically support and electrically power the second set of LEDs. The second circuit board can be located in a plane that is substantially parallel to the third plane.

In some examples, the first plane and the second plane can be angled apart by a first angle. The first plane and the third plane can be angled apart by a second angle. The second angle can substantially equal the first angle.

In some examples, the first plane and the second plane can be angled apart by a first angle. The first plane and the third plane can be angled apart by a second angle. The first angle and the second angle can be between about eight degrees and about twelve degrees, respectively.

In some examples, a first light baffle can be disposed between the infrared detector assembly and the first set of LEDs, disposed entirely on the first side of the first plane and spaced apart from the first plane, and arranged to prevent light emitted by the first set of LEDs from directly entering the infrared detector assembly. A second light baffle can be disposed between the infrared detector assembly and the second set of LEDs, disposed entirely on the first side of the first plane and spaced apart from the first plane, and arranged to prevent light emitted by the second set of LEDs from directly entering the infrared detector assembly.

In some examples, a first anamorphic lens can angularly widen the infrared light emitted from the first infrared LED and the second infrared LED. A second anamorphic lens can angularly widen the infrared light emitted from the third infrared LED and the fourth infrared LED.

While preferred embodiments of the present disclosed subject matter have been shown and described herein, it will be obvious to those skilled in the art that such embodiments are provided by way of example only. Numerous variations, changes, and substitutions will now occur to those skilled in the art, upon reading and understanding the material provided herein, without departing from the disclosed subject matter. It should be understood that various alternatives to the embodiments of the disclosed subject matter described herein may be employed in practicing the various embodiments of the subject matter. It is intended that the following claims define the scope of the disclosed subject matter and that methods and structures within the scope of these claims and their equivalents be covered thereby.

What is claimed is:

1. An infrared illumination and detection system, comprising:

an infrared detector assembly configured to sense light at a first wavelength, the infrared detector assembly defining a longitudinal axis as extending from about a center of a sensor of the infrared detector assembly through about a center of a lens of the infrared detector assembly, the infrared detector assembly defining a first plane as being substantially orthogonal to the longitudinal axis and passing through an intersection of the longitudinal axis and a surface of the lens of the infrared detector assembly, the infrared detector assembly being disposed entirely on a first side of the first plane;

a housing coupled to the infrared detector assembly and disposed entirely on the first side of the first plane; and a first set of light-emitting diodes (LEDs) coupled to the housing, the first set of LEDs being disposed entirely on the first side of the first plane, each LED in the first set of LEDs configured to emit light from the first side of the first plane to a second side of the first plane, each LED in the first set of LEDs having an emission surface that is substantially parallel to a second plane that is angled with respect to the first plane, the first set of LEDs including a first infrared LED configured to emit light with a spectrum that substantially includes the first wavelength, the first set of LEDs including a first visible LED configured to emit light with a spectrum that substantially excludes the first wavelength.

2. The system of claim 1, further comprising a first circuit board configured to mechanically support and electrically power the first set of LEDs.

3. The system of claim 2, wherein the first circuit board is located in a plane that is substantially parallel to the second plane.

4. The system of claim 2, wherein the first circuit board is further configured to modulate the first infrared LED.

5. The system of claim 1, further comprising a first light baffle that is:

disposed between the infrared detector assembly and the first set of LEDs, disposed entirely on the first side of the first plane and spaced apart from the first plane, and arranged to prevent light emitted by the first set of LEDs from directly entering the infrared detector assembly.

6. The system of claim 1, wherein the infrared detector assembly includes a wavelength-sensitive filter configured to block light at wavelengths away from the first wavelength.

7. The system of claim 1, wherein the infrared detector assembly includes a high-pass filter with a filter edge wavelength greater than or equal to about 780 nm, such that light at wavelengths less than about the filter edge wavelength are substantially blocked and light at wavelengths greater than the filter edge wavelength are substantially directed onto the sensor.

8. The system of claim 1, wherein the sensor is a multipixel sensor that is positioned at or near a focal plane of the lens.

9. The system of claim 1, wherein the sensor is a multipixel sensor that is spaced apart from the lens to form an image on the multi-pixel sensor of objects up to about three meters away from the housing.

10. The system of claim 1, wherein:

the first set of LEDs further includes a second infrared LED configured to emit light with a spectrum that includes the first wavelength; and the first visible LED is located between the first infrared LED and the second infrared LED; and further comprising a first anamorphic lens configured to angularly widen the infrared light emitted from the infrared LED and the second infrared LED.

11. The system of claim 1, further comprising a second set of LEDs coupled to the housing such that the infrared detector assembly is located between the first set of LEDs and the second set of LEDs, the second set of LEDs being disposed entirely on the first side of the first plane, each LED in the second set of LEDs configured to emit light from the first side of the first plane to the second side of the first plane, each LED in the second set of LEDs having an emission surface that is substantially parallel to a third plane that is angled with respect to the first plane and angled with respect to the second plane, the second set of LEDs including a third infrared LED configured to emit light with a spectrum that substantially includes the first wavelength, the second set of LEDs including a second visible LED configured to emit light with a spectrum that substantially excludes the first wavelength.

12. The system of claim 11, further comprising a second circuit board configured to mechanically support and electrically power the second set of LEDs, the second circuit board being located in a plane that is substantially parallel to the third plane.

13. The system of claim 11, wherein:

the first plane and the second plane are angled apart by a first angle;

the first plane and the third plane are angled apart by a second angle; and the second angle substantially equals the first angle.

14. The system of claim 11, wherein:

the first plane and the second plane are angled apart by a first angle;

the first plane and the third plane are angled apart by a second angle; and the first angle and the second angle are between about eight degrees and about twelve degrees, respectively.

15. A method for illuminating and imaging a scene, the method comprising:

producing first infrared light with a first infrared light-emitting diode (LED) and a second infrared LED that are disposed on a first circuit board;

angularly widening the first infrared light with a first anamorphic lens to produce first widened infrared light;

producing first visible light with a first visible LED that is disposed on the first circuit board;

producing second infrared light with a third infrared LED and a fourth infrared LED that are disposed on a second circuit board, the second circuit board being angled with respect to the first circuit board;

angularly widening the second infrared light with a second anamorphic lens to produce second widened infrared light;

producing second visible light with a second visible LED that is disposed on the second circuit board;

directing the first widened infrared light, the second widened infrared light, the first visible light, and the second visible light toward a scene as illuminating light;

reflecting, from the scene, at least some of the illuminating light to form reflected light;

collecting, with a lens, at least some of the reflected light to form collected light;

spectrally filtering, with a wavelength-sensitive filter, the collected light to block wavelengths away from a first infrared wavelength to form spectrally filtered light; and detecting, with a multi-pixel sensor, the spectrally filtered light to form image data that corresponds to the scene, the multi-pixel sensor being angled with respect to both the first circuit board and the second circuit board.

16. An infrared illumination and detection system, comprising:

an infrared detector assembly configured to sense light at a first wavelength, the infrared detector assembly defining a longitudinal axis as extending from about a center of a multi-pixel sensor of the infrared detector assembly through about a center of a lens of the infrared detector assembly, the infrared detector assembly defining a first plane as being substantially orthogonal to the longitudinal axis and passing through an intersection of the longitudinal axis and a surface of the lens of the infrared detector assembly, the infrared detector assembly being disposed entirely on a first side of the first plane, the infrared detector assembly including a high-pass filter with a filter edge wavelength greater than or equal to 780 nm, such that light at wavelengths less than the filter edge wavelength are blocked and light at wavelengths greater than the filter edge wavelength are directed onto the multi-pixel sensor;

a housing coupled to the infrared detector assembly and disposed entirely on the first side of the first plane;

a first set of light-emitting diodes (LEDs) coupled to the housing, the first set of LEDs being disposed entirely on the first side of the first plane, each LED in the first set of LEDs configured to emit light from the first side of the first plane to a second side of the first plane, each LED in the first set of LEDs having an emission surface that is substantially parallel to a second plane that is angled with respect to the first plane, the first set of LEDs including a first infrared LED and a second infrared LED that are configured to emit light with a spectrum that substantially includes the first wavelength, the first set of LEDs including a first visible LED configured to emit light with a spectrum that substantially excludes the first wavelength; and a first circuit board configured to mechanically support and electrically power the first set of LEDs, the first circuit board being located in a plane that is substantially parallel to the second plane;

a second set of LEDs coupled to the housing such that the infrared detector assembly is located between the first set of LEDs and the second set of LEDs, the second set of LEDs being disposed entirely on the first side of the first plane, each LED in the second set of LEDs configured to emit light from the first side of the first plane to a second side of the first plane, each LED in the second set of LEDs having an emission surface that is substantially parallel to a third plane that is angled with respect to the first plane and angled with respect to the second plane, the second set of LEDs including a third infrared LED and a fourth infrared LED that are configured to emit light with a spectrum that substantially includes the first wavelength, the second set of LEDs including a second visible LED configured to emit light with a spectrum that substantially excludes the first wavelength;

a second circuit board configured to mechanically support and electrically power the second set of LEDs, the second circuit board being located in a plane that is substantially parallel to the third plane.

17. The system of claim 16, wherein:

the first plane and the second plane are angled apart by a first angle;

the first plane and the third plane are angled apart by a second angle; and the second angle substantially equals the first angle.

18. The system of claim 16, wherein:

the first plane and the second plane are angled apart by a first angle;

the first plane and the third plane are angled apart by a second angle; and the first angle and the second angle are between about eight degrees and about twelve degrees, respectively.

19. The system of claim 16, further comprising:

a first light baffle that is disposed between the infrared detector assembly and the first set of LEDs, disposed entirely on the first side of the first plane and spaced apart from the first plane, and arranged to prevent light emitted by the first set of LEDs from directly entering the infrared detector assembly; and a second light baffle that is disposed between the infrared detector assembly and the second set of LEDs, disposed entirely on the first side of the first plane and spaced apart from the first plane, and arranged to prevent light emitted by the second set of LEDs from directly entering the infrared detector assembly.

20. The system of claim 16, further comprising:

a first anamorphic lens configured to angularly widen the infrared light emitted from the first infrared LED and the second infrared LED; and a second anamorphic lens configured to angularly widen the infrared light emitted from the third infrared LED and the fourth infrared LED.

* * * * *